June 4, 1957  D. R. WILLIAMS  2,794,484
PLASTIC SEALING DEVICE
Filed Jan. 22, 1954
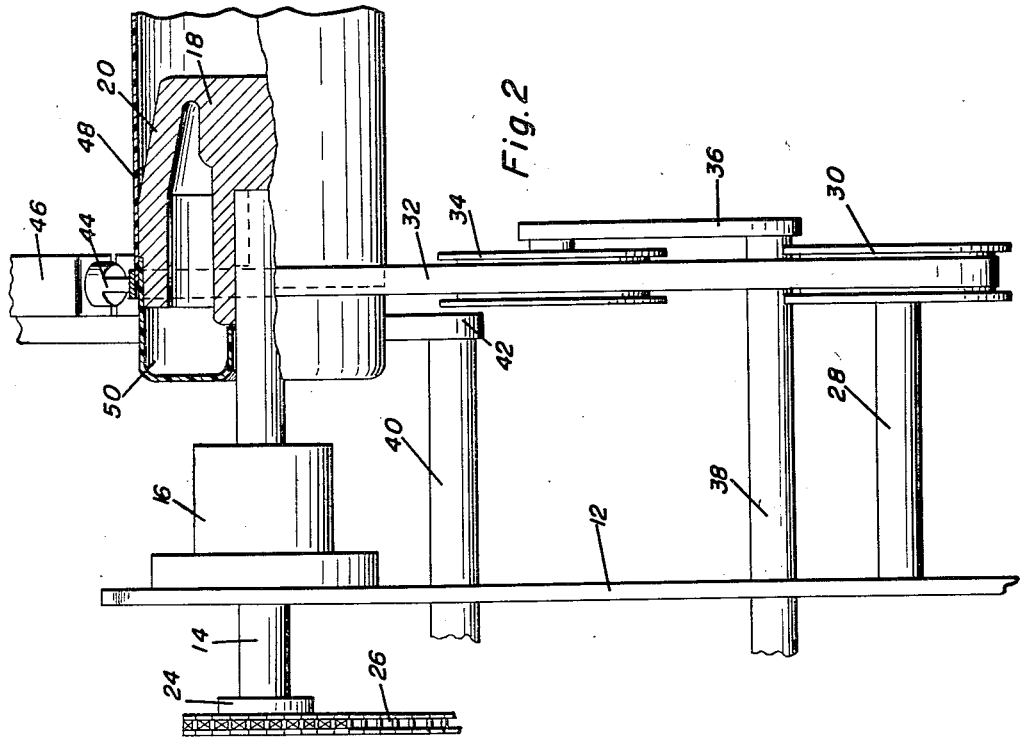
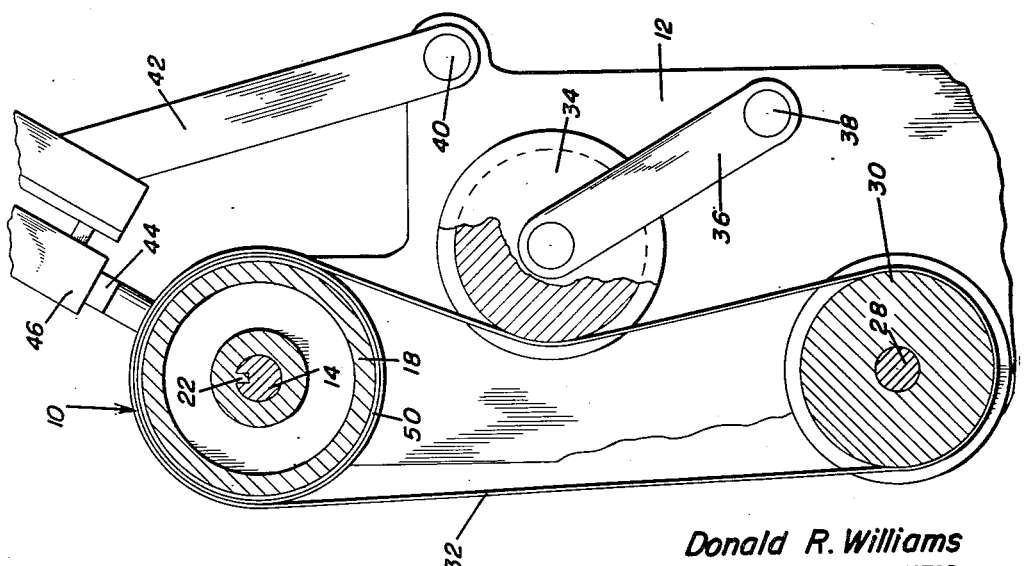
Donald R. Williams
INVENTOR.

2,794,484

PLASTIC SEALING DEVICE

Donald R. Williams, Chippewa Falls, Wis.

Application January 22, 1954, Serial No. 405,583

1 Claim. (Cl. 154—42)

This invention relates to a plastic sealing device and more specifically provides a device for fusing overlapping edges of plastic material to each other.

An object of this invention is to provide a plastic sealing device utilizing an improved method for securing adjoining edges of plastic material together.

Another object of this invention is to provide a plastic sealing device for sealing adjoining edges of plastic material by moving the edges through and between a pair of movable members and applying heat and pressure to the overlapping edges of the plastic material.

A further object of this invention is to provide a plastic sealing device which is simple in construction, easy and efficient in operation, well adapted for the purposes intended and relatively inexpensive to manufacture and maintain.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevation with portions thereof in section showing the relation between the various elements of the plastic sealing device of the present invention;

Figure 2 is a top plan view with portions in section showing the specific details of the plastic sealing device.

Referring now specifically to the drawings it will be seen that the numeral 10 generally designates the plastic sealing apparatus of this invention. The sealing apparatus 10 includes a mounting plate 12, a driving shaft 14 journalled in a bearing 16 on the plate 12 and removably supporting a mandrel 18 at one end thereof. The extreme end of the mandrel 18 is provided with an inwardly tapering circumference 20 and the mandrel 18 is removably secured to the rotating shaft 14 by a suitable slot and key arrangement 22. The end of the shaft 14 remote from the mandrel 18 is provided with a sprocket gear 24 receiving a driving sprocket chain 26 for rotating the mandrel 18. A rod 28 having a pulley 30 rotatably journaled thereon is secured to the plate 12 in remote relation to the shaft 14 and the pulley 30 is in line with the mandrel 18, and an elongated endless belt 32 surrounds the pulley and the mandrel 18 and a tensioning pulley 34 engages the belt 32 between the mandrel 18 and the pulley 34 tensioning the belt 32. The pulley 34 is mounted on a link 36 which is secured at one end to a shaft 38 which is journaled in the plate 12 for arcuate movement of the pulley 34 into and out of engagement with the belt 32 thereby providing an adjustment of the belt 32. Another shaft 40 is mounted on the plate 12 and includes an elongated link 42 at its end for supporting a shoe 44 and means 46 for heating the shoe 44. By movement of the shaft 40 and the link 42, the heating shoe 44 may be engaged with the outer surface of the endless belt 32 or disengaged therefrom as desired. Plastic tubular member 48 and the member 50 are overlapped at their adjoining edges and placed on the mandrel 18 in an obvious manner. The endless belt 32 is positioned over the overlapping portion and as the mandrel 18 rotates and the belt 32 moves, the heated shoe 44 is brought into contact with the belt 32 thereby conducting heat to the adjoining edges of the plastic members 48 and 50 for fusing the overlapping edges thereof. The endless belt 32 is constructed of any material having high heat conductive qualities such as stainless steel. Obviously, the mandrel 18 may be constructed in any particular shape for sealing plastic devices of various shapes and sizes. It will be seen that the particular endless belt construction and the orientation thereof with the mandrel 18 permits an easy and efficient application of heat and pressure for sealing the plastic members 48 and 50 to each other. Obviously, the idler or tensioning pulley 34 may be dispensed with and the pulley 30 may be adjustably mounted in any conventional manner. The particular shape of the shoe 44 and the nature of the heating means 46 is optional as is the particular shape of the mandrel 18. The device may be set up for sealing flat sheets, tubular members or any irregular shapes. Further in the specific embodiment illustrated, the tubular plastic member 48 is the sidewall of a plastic container and the member 50 is the relatively thicker bottom wall of the plastic container. After the bottom 50 and the sidewalls 48 have been sealed together, the aperture in the center of the bottom 50 is sealed in a conventional manner. As specifically shown, the mandrel 18 has a recessed portion for receiving the thick bottom member thereby giving a smoother surface of contact for the belt 32.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

Apparatus for fusing the overlapping edge portions of two members of endless plastic material with the members being of a shape to form a container when fused and with the inner member being substantially thicker than the outer member, which comprises an elongated mandrel having a recess at one end which extends inwardly to the end of the mandrel a short distance compared to the length of the mandrel, said recess receiving the thicker inner member of the members to be joined together and the thinner outer member overlapping the thicker member at said recess, means connected to the inside of the mandrel to rotate the members and effect movement of the members at the recess on the mandrel through a fixed path of rotation, an endless high heat conductive belt extending along the path of movement of the mandrel recess, means to drive said belt simultaneously with the rotation of said mandrel, means to tension the belt into engagement with the thinner outermost member at said recess as the belt and mandrel revolve to apply pressure to the members as said members are pressed between the belt and the recess on the mandrel, a heating shoe disposed outwardly of the mandrel at the recess on said mandrel, and means to place the heating shoe into engagement with the belt at the recess on the mandrel as the belt rotates in engagement with the outermost member to simultaneously apply heat and pressure to the members and fuse the members together at the overlapping engagement of the members at the recess on said mandrel.

(References on following page)

References Cited in the file of this patent

UNITED STATES PATENTS

| | | |
|---|---|---|
| 1,774,983 | Loughead | Sept. 2, 1930 |
| 2,135,763 | Nicholson | Nov. 8, 1938 |
| 2,441,940 | Rohdin | May 18, 1948 |
| 2,442,443 | Swallow | June 1, 1948 |
| 2,451,728 | Gardner et al. | Oct. 19, 1948 |
| 2,469,972 | Lowry et al. | May 10, 1949 |
| 2,660,219 | Haas et al. | Nov. 24, 1953 |
| 2,680,470 | Stanton | June 8, 1954 |

FOREIGN PATENTS

| | | |
|---|---|---|
| 647,026 | Great Britain | Dec. 6, 1950 |